United States Patent [19]
Harms, II

[11] Patent Number: 5,316,677
[45] Date of Patent: May 31, 1994

[54] PLEATED FILTERING SLEEVE FOR ROTATIONAL FLOW FILTER SYSTEMS

[75] Inventor: Harold H. Harms, II, Palm Beach Gardens, Fla.

[73] Assignee: Harmsco, Inc., Riviera Beach, Fla.

[21] Appl. No.: 918,236

[22] Filed: Jul. 23, 1992

Related U.S. Application Data

[63] Continuation-in-part of Ser. No. 695,404, May 3, 1991, Pat. No. 5,174,896, which is a continuation-in-part of Ser. No. 543,326, Jun. 25, 1990, Pat. No. 5,196,119.

[51] Int. Cl.⁵ ................................... B01D 27/06
[52] U.S. Cl. .................... 210/455; 210/493.5; 55/500; 55/521
[58] Field of Search ............. 210/493.1, 493.2, 493.3, 210/493.4, 493.5, 455; 55/497, 500, 521

[56] References Cited

U.S. PATENT DOCUMENTS

| | | | |
|---|---|---|---|
| 2,801,009 | 7/1957 | Bowers | 210/455 |
| 4,552,657 | 11/1985 | Ogawa | 210/493.1 |
| 4,655,921 | 4/1987 | Fujinata | 210/493.5 |
| 4,673,503 | 6/1987 | Fujinata | 210/493.1 |
| 4,738,778 | 4/1988 | Taki et al. | 210/493.1 |
| 4,746,432 | 5/1988 | Taki et al. | 210/493.5 |

Primary Examiner—Robert A. Dawson
Assistant Examiner—W. L. Walker
Attorney, Agent, or Firm—Quarles & Brady

[57] ABSTRACT

A filter cartridge for use in a fluid filtering system, constructed to induce rotational flow in the unfiltered fluid, includes a pleated filter sleeve in which the individual sleeves are slanted relative to the sleeve circumference in a direction opposite to the direction of the rotational flow fluid. The slanted pleats can be constructed by creasing a sheet of filter media at alternatingly shorter and longer widths to form pleats having relatively shorter front legs and relatively longer back legs. The shorter front legs bias the pleats in the counter-rotational direction.

2 Claims, 3 Drawing Sheets

PLEATED FILTERING SLEEVE FOR ROTATIONAL FLOW FILTER SYSTEMS

CROSS-REFERENCE TO RELATED APPLICATIONS

This is a continuation-in-part of co-pending U.S. patent application Ser. No. 695,404, filed May 3, 1991, now U.S. Pat. No. 5,174,896, which is a continuation-in-par patent application Ser. No. 543,326, filed Jun. 25, 1990, now U.S. Pat. No. 5,196,119.

FIELD OF THE INVENTION

The present invention relates generally to fluid filter systems. More particularly, the invention relates to fluid filter systems having central filter cartridges.

BACKGROUND OF THE INVENTION

Fluid filter systems utilizing central filter cartridges are well known. For example, U.S. Pat. No. 4,561,979 to Harms et al., which is incorporated by reference into this disclosure, discusses a fluid filter system having a central filter cartridge. In the Harms et al. system, a central filter cartridge defines a filtering partition between an outer, unfiltered fluid chamber and an inner, filtered fluid chamber. Unfiltered fluid is introduced to the outer chamber through an inlet in the outer housing of the system. Due to a pressure differential, the fluid is forced through a pleated filter media sleeve of the filter cartridge, which is disposed in a central portion of the outer housing. The filtered fluid exiting the filter media travels upwardly in a annular volume defined by the filter sleeve and a smaller diameter, outlet tube disposed in a central cavity of the filter cartridge. The filtered fluid, with associated gases, is forced upwardly into an upper chamber where the flow is reversed and evacuated downwardly through the outlet tube.

In the Harms et al. filter, unfiltered fluid enters the inlet chamber through an inlet port in the bottom surface of the filter housing. The upward, axial flow relative to the pleated filter media can impart forces on the individual filter media pleats, causing the pleats to compress against one another or "blind off." Blinding off reduces the filter media surface area available for filtering and can affect the flow efficiency of the system. Additionally, the reduced surface area can cause concentrations of filtered debris on the available media surface area, thereby requiring premature replacement or servicing of the filter cartridge.

An improved cartridge filter system that reduces the effects of this blinding off phenomenon is described in co-pending U.S. patent application Ser. No. 543,326 to Harms et al., which is incorporated by reference into this disclosure. This filter system is constructed to create rotational flow around the pleated filter media to reduce the likelihood of blinding off.

In this rotational flow filter system, unfiltered fluid is introduced into the filter system through tangential inlet passages in the side wall of the filter housing. The entering fluid flows tangentially to the housing contour and is induced into a unidirectional rotational flow about the central axis of the housing by the curvature of the housing. The rotational flow imparts substantially uniform forces tangential to the pleats of the filter media. Thus, the pleats are urged in the same direction in a substantially uniform manner, thereby reducing the likelihood of blinding off.

SUMMARY OF THE INVENTION

It is an object of the invention to further improve the performance characteristics of a cartridge filter system which utilizes rotational flow.

It is another object of the invention to improve the performance characteristics without significant and expensive modification of an existing rotational flow filter system.

It is still another object of the invention to extend the useful life of a replaceable filter cartridge for use in the rotational flow filter system.

It is yet another object of the invention to provide a simple, cost effective method for manufacturing the improved filter cartridge.

It is a further object of the invention to provide apparatus for manufacturing an improved filter cartridge.

These and other objects of the invention are achieved by a filter cartridge having pleated filter media in which the individual pleats are angled relative to the perimeter of the filter media. The angled pleats are biased in a direction opposite the direction of the rotational flow o the surrounding fluid. During filtering operation, the tangential forces exerted on the pleats by the rotational flow urge the slanted pleats to open toward the direction of rotational flow. This opening increases the exposed surface area of the filter media and substantially prevents blinding off of the individual pleats. Further, the counter-rotationally angled pleats provide a series of fluid paths into the inner portions of the filter media, thereby utilizing a greater portion of the available filter surface area. Accordingly, the improved filter cartridge increases filtration efficiency and reduces the frequency of cartridge replacement and servicing by ensuring a uniform utilization of the entire filter media surface area.

According to the invention, the slanted pleats can be constructed in a variety of ways. In a preferred embodiment, each pleat of the filter media is formed by a relatively shorter front leg and a relatively longer back leg. All pleats legs can be of equal length in the axial direction of the filter cartridge. The shorter width of the front leg relative to the width of the back leg biases each pleat toward its respective front leg, thereby creating a series of slanted pleats along the periphery of the filter media. To prevent the pleated filter from expanding outwardly under the stresses created by the slanted pleats, a series of spaced support bands can be wrapped around the filter. Further, the filter cartridge can include end caps at the axial ends of the media to further prevent outward expansion.

BRIEF DESCRIPTION OF THE DRAWINGS

A full understanding of the invention to enable a person of ordinary skill in the art to make and use the invention can be gained from the following description of the preferred embodiments when read in conjunction with the accompanying drawings in which.

DETAILED DESCRIPTION OF THE PREFERRED EMBODIMENTS

Figure 1:
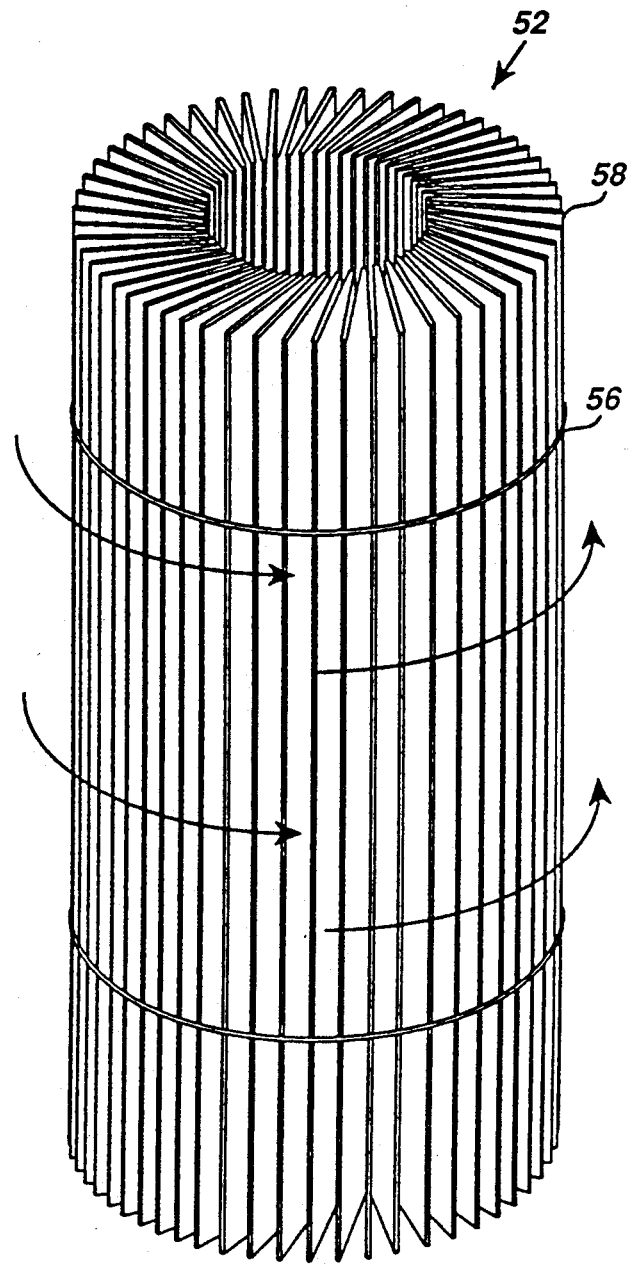
FIG. 1 is a perspective view of a filter sleeve according to the invention.

The invention relates to an improved filter cartridge for a fluid filter utilizing rotational flow. Referring to the figures, a filter 10 includes a filter cartridge 50 for filtering fluid passing from an inlet chamber 12 to an outlet chamber 28. The filter cartridge 50 includes a body or sleeve 52 of pleated filter media in which each pleat 58 is angled relative to the perimeter of the filter media. As used in this specification, angled pleats mean pleats which are angled relative to lines substantially perpendicular to the perimeter of the media 52. The media 52 is preferably constructed as an annular sleeve, but can be formed in other geometric configurations according to the particular filtering application.

Figure 3A:
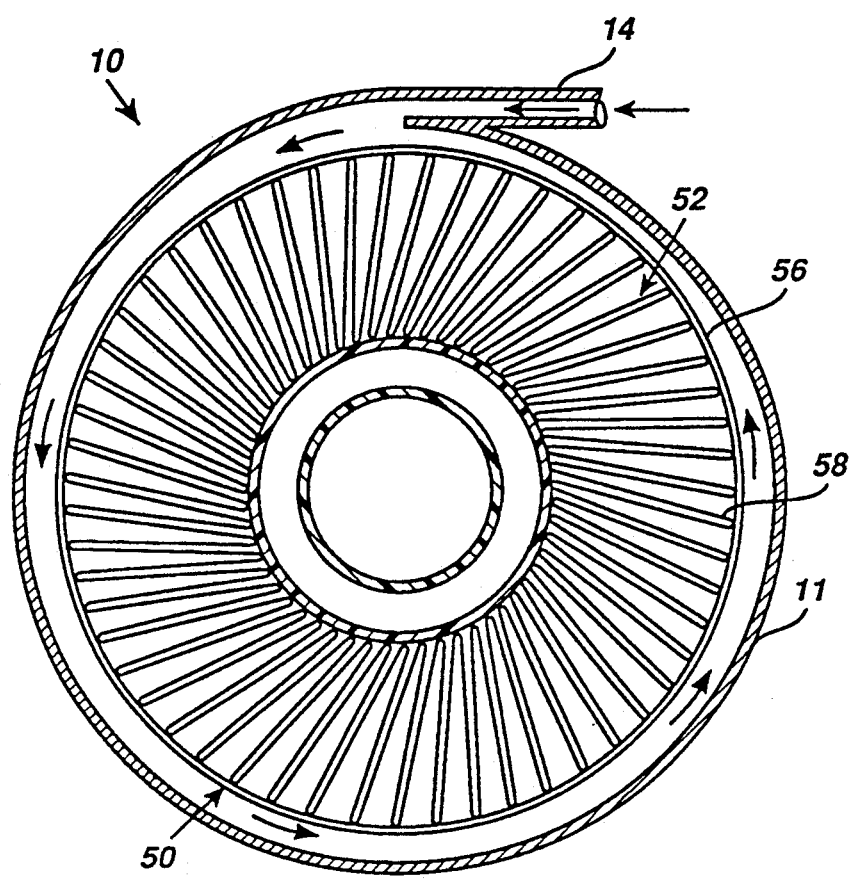
FIG. 3a is a sectional view, taken along line 3a—3a in FIG. 2, showing the angled pleats of the invention.

As illustrated in FIG. 3a, as fluid enters the filter 10 through an inlet 14, the curved surface of an outer housing 11 of the filter 10 induces the fluid into a unidirectional, rotational flow about the central axis of the filter 10. The outer housing 11 is preferably cylindrical, but can be constructed in any suitable shape to create rotational flow in the incoming fluid.

The inlet 14 is preferably configured tangential to the outer housing surface so that incoming fluid flows directly from the inlet 14 to the inner surface of the outer housing 11 without an angled transition or spacing. Although a single inlet 14 is shown for illustration purposes, a plurality of similar inlets can be provided. Alternatively, a vertical, elongated slot can be formed in the outer housing 11 so that fluid enters tangentially along the entire height of the outer housing 11. Also, a curved inlet conduit 18 can be provided in a bottom surface of the outer housing 11 to introduce fluid from an inlet pipe 17 to inlet chamber 12. The conduit 18 is preferably constructed to guide incoming fluid into tangential flow with the inner surface of an outer housing 11. The conduit 17 can be located off center from the central height axis of the chamber and be angled to direct incoming flow towards the curved surface of the outer housing at a shallow angle approaching tangential at less than 45° and preferably less than 20°. According to the invention, the angled pleats 58 are biased in a counter-rotational direction opposite the direction of the rotational flow of the surrounding fluid.

During filtering operation, the tangential forces exerted on the pleats 58 by the rotational flow of the fluid in the inlet chamber 12 urge the pleats 58 to open in the direction of rotational flow. This opening increases the exposed surface area of the sleeve 52 and substantially prevents the individual pleats 58 from compressing together, or "blinding off." Further, the counter-rotationally angled pleats 58 provide a series of fluid paths into the inner portions of the filter sleeve 52, thereby utilizing a greater portion of the available filter media surface area. Accordingly, the improved filter cartridge increases filtration efficiency and reduces the frequency of replacement by providing a more uniform utilization of the entire filter sleeve surface area.

Figure 3B:
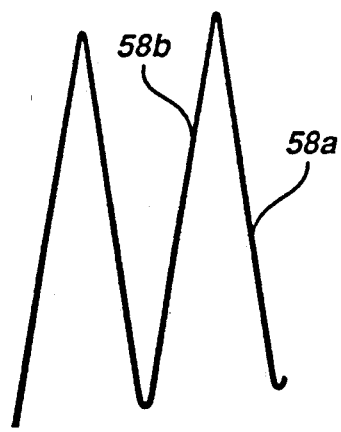
FIG. 3b is an enlarged view of a pleat shown in FIG. 3a, showing different width pleat legs for the angled pleats of the invention.

According to the invention, the slanted pleats 58 can be constructed in a variety of ways. Referring to FIG. 3b, each pleat 58 is preferably formed by a relatively shorter front leg 58a and a relatively longer back leg 58b. The width along which reference to shorter and longer is made in the specification is the extension of each pleat leg from the junction with an adjacent pleat leg to the junction with the oppositely adjacent pleat leg, when viewed from the bottom, as in FIGS. 3a and 3b. The pleat legs 58a and 58b can be of equal length in the axial direction of the sleeve 52. The shorter width of the front leg 58a relative to the width of the back leg 58b biases each pleat 58 toward its respective front leg 58a, thereby creating a series of slanted pleats 58 along the circumference of the filter sleeve 52. The front legs 58a are positioned to bias the pleats 58 into the counter-rotational direction opposite the rotational flow direction of the surrounding fluid.

It has been found that the pleats perform optimally when they remain straight and lean in the counter-rotational direction in a range between 10° and 30° and preferably at approximately 20°. As shown in FIGS. 3a and 3b, this configuration results in a triangular geometry for each pleat and an expanding spacing between each pleat towards the external periphery of the cartridge. As used in the present specification and claims, the leaning angle are defined relative to a line transverse to the periphery of the filter media at the location of the particular pleat. In the case of an annular filter sleeve, the angle is defined relative to a radial line extending from the base of the particular sleeve. In order to slant the pleats into the preferred range of leaning angles, the ratio of the short leg width to the longer leg width is greater than 0.95 but less than 1.00 and is preferably between 0.97 and 0.99. By constructing the pleat legs in accordance with this preferred range of ratios, the resulting pleats remain substantially straight and lean towards the desired angle, rather than curve. The substantially straight, leaning orientation of the pleats improves their ability to remain separated and open up under the impact of the rotational flow.

Figure 2:
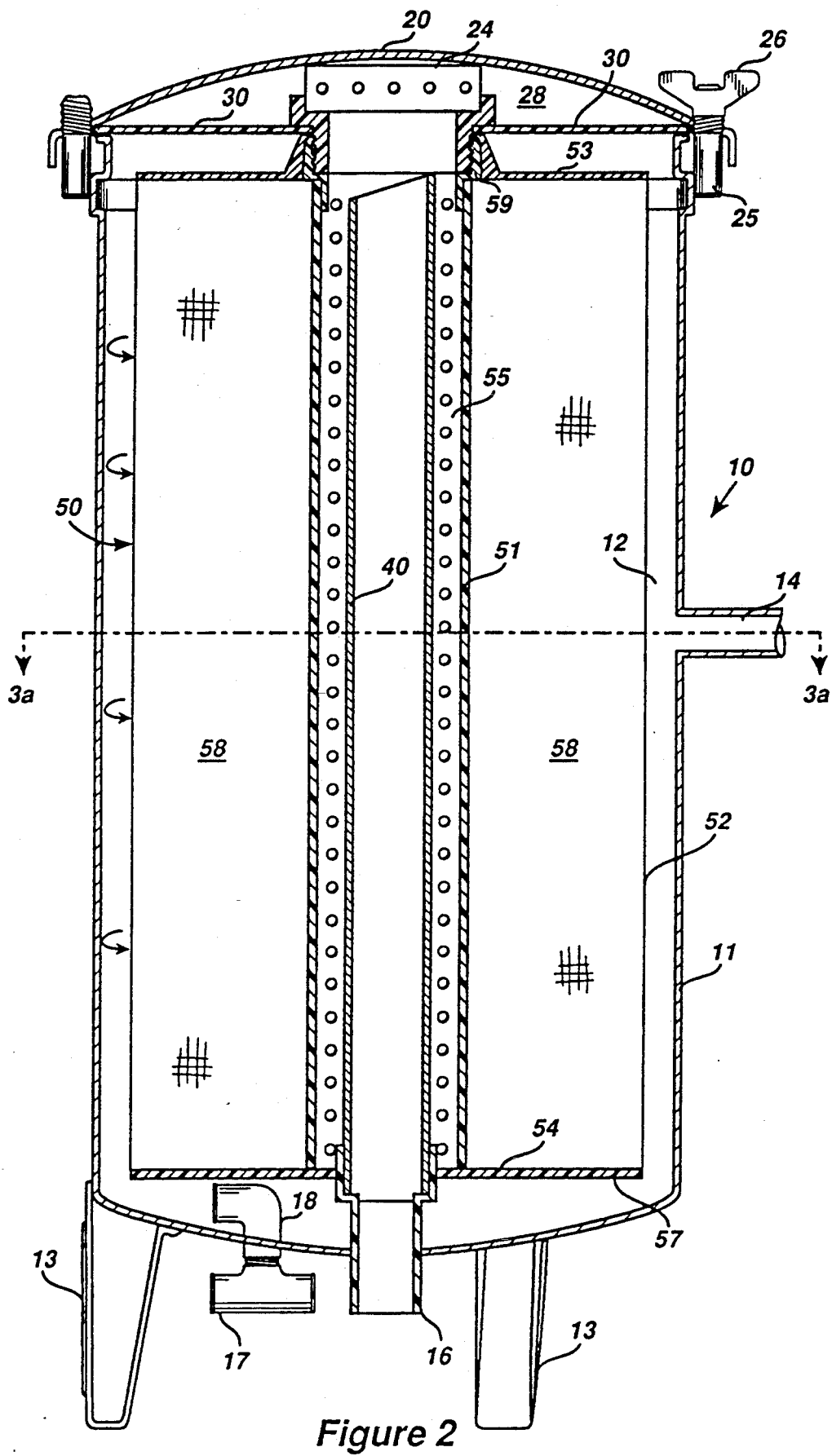
FIG. 2 is a vertical sectional view of a single cartridge filter showing two embodiments of a fluid inlet for rotational flow.

To prevent the pleated sleeve 52 from expanding outwardly under stresses created by the slanted pleats 58, a series of spaced support rings 56 can be wrapped around the sleeve 52. Additionally, as shown in FIG. 2, the filter cartridge 50 can include end caps 53 and 54 at the axial ends of the sleeve 52 to secure pleats 58. Preferably, the end caps 53 and 54 are constructed of thermoplastic material into which the axial ends of the sleeve 52 can be embedded during the manufacture of the filter cartridge 50.

In another embodiment of the invention, the sleeve 50 can be formed by pleats having equal widths and torqued to a slanted configuration by the support bands 56 and end caps 53 and 54. Alternatively, other constructions, such as wire meshing in the pleats, can be employed to form the slanted pleats without departing from the scope of the invention, which resides in the use of slanted pleats in a filter cartridge to improve the performance and durability of a rotational flow filter system.

The rotational flow filter system 10 can include an outer housing 11 having a closed bottom and an open top, over which a housing cover 20 can be secured in sealing engagement by welded bolts 25 and wing nuts 26. The outer housing 11 defines an inlet chamber 12 for receiving unfiltered fluid from the inlet 14. Fluid in the inlet chamber 12 can be separated from an outlet chamber 28 by a top plate 30. The top plate 30 can be secured between the upper edge of the outer housing 11 and the periphery of the housing cover 20, thereby sealingly separating the inlet chamber 12 from the outlet chamber 28.

The filter cartridge 50 preferably depends from the top plate 30 into the inlet chamber 12. The filter cartridge 50 includes the sleeve 52 of pleated filter media. Preferably, the sleeve 52 is structurally reinforced by a perforate tube 51 positioned along the inner surface of the sleeve 50. The tube 51 is perforated with a plurality of holes to allow passage of fluid from the sleeve 52 to an annular upflow chamber 55, defined by the tube 51 and a smaller diameter, outlet tube 40. The tube 51 and the sleeve 52 are preferably secured at their axial ends by end caps 53 and 54.

In the preferred embodiment, the cartridge 50 is secured to the top plate 30 by a threaded cartridge coupling 59 integrally connected to the upper end cap 53. A threaded support ring 62 engages the coupling 59 through a central aperture in the top plate 30 and tightens the end cap 53 into sealing engagement with the lower surface of the top plate 30.

The lower end of the cartridge 50 can be sealingly secured to the upper end of an outlet port 16. Preferably, the lower end cap 54 has an inner aperture through which the outlet port 16 extends. The edge of the inner aperture of the end cap 54 sealingly engages the outlet port 16 in a friction fit. The outlet tube 40 connects to an inner surface of the outlet port 16 and extends upwardly to upper end of the cartridge 50.

During operation of the filter 10, fluid enters through the inlet 14 to the inlet chamber 12 and is induced into rotational flow by the curved surface of the outer housing 11. The fluid is forced into the filter cartridge 50 by pressure created by an external force (not shown) connected to the inlet 14. Alternatively, fluid can be introduced to the inlet chamber 12 through the curved conduit 18.

The filter media 52 separates contaminants from the fluid, which enters the upflow chamber 55 through the perforate tube 51. The filter fluid travels upwardly to the outlet chamber 28. In the outlet chamber 28, the flow is reversed, and the fluid and associated gases exit the system through the outlet tube 40 and outlet port 16.

Thus, the pleated filter sleeve with slanted pleats according to the invention can be used with a rotational flow filter system, such as the filter 10 described in detail above, to increase the available surface area of the filter media. This increased surface area improves the filtration efficiency of the filter system and can extend the useful life of the filter cartridge.

The slanted pleat filter media of the invention can also be utilized with rotational flow filtering systems of other constructions. For example, the filter cartridge of the invention can be used in a rotational flow filtering system in which filter fluids are exhausted directly from the interior chamber of the filter cartridge. This direct exhaust can be directed either upwardly or downwardly. Further, the slanted pleat filter cartridge of the invention can be used in a horizontally configured filtering system in which the filtered fluids are exhausted substantially horizontally from the inner chamber of the filter cartridge.

Although a detailed description of the invention has been given with reference to particular embodiments, this description is not to be construed as limiting the scope of this invention. Many variations and modifications can now occur to those skilled in the art in view of this disclosure. Accordingly, the scope of the present invention should not be determined by the above description, but rather by a reasonable interpretation of the appended claims.

I claim:

1. A filter cartridge for use in a filtering system, said filtering system having an inlet chamber surrounding the filter cartridge and an outlet chamber in fluid communication with an interior portion of the filter cartridge, said cartridge comprising;

pleated filter media having a series of pleats arranged to slant in a slant direction opposite a flow direction in the inlet chamber, wherein each pleat is formed by a first pleat leg adjacent in the slant direction to a second pleat leg, each pleat slanting up to 30° relative to a line transversed to a periphery of the filter cartridge, wherein the spacing between each pleat expands towards the periphery of the filter cartridge.

2. The filter cartridge according to claim 1, wherein said first pleat leg and said second pleat leg are straight and form two sides of a triangular geometry.

* * * * *